(12) United States Patent
Bochart

(10) Patent No.: US 10,895,218 B2
(45) Date of Patent: Jan. 19, 2021

(54) LINER FOR ENGINE CYLINDER WITH LOWER LINER SUPPORT

(71) Applicant: Caterpillar Inc., Deerfield, IL (US)

(72) Inventor: Michael R. Bochart, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 17 days.

(21) Appl. No.: 16/265,086

(22) Filed: Feb. 1, 2019

(65) Prior Publication Data
US 2020/0248645 A1   Aug. 6, 2020

(51) Int. Cl.
*F02F 1/10*   (2006.01)
*F02F 1/16*   (2006.01)
*F01P 3/02*   (2006.01)

(52) U.S. Cl.
CPC .................. *F02F 1/16* (2013.01); *F01P 3/02* (2013.01); *F01P 2003/021* (2013.01)

(58) Field of Classification Search
CPC ..................................... F02F 1/16; F02F 1/163
USPC ........................................................ 123/41.72
See application file for complete search history.

(56) References Cited

U.S. PATENT DOCUMENTS

| | | | | |
|---|---|---|---|---|
| 3,800,751 A * | 4/1974 | Glassey | ..................... | F02F 1/14 123/41.84 |
| 4,127,058 A | 11/1978 | Rohrle | | |
| 4,399,783 A * | 8/1983 | Hauser, Jr. | ................ | F16J 10/04 123/193.2 |
| 4,562,799 A * | 1/1986 | Woods | ................... | F02F 7/0087 123/193.2 |
| 6,116,198 A * | 9/2000 | Kirtley | ..................... | F02F 1/163 123/193.3 |
| 6,557,513 B1 * | 5/2003 | Hill | ......................... | F02F 1/163 123/193.1 |
| 7,806,098 B2 | 10/2010 | Bing et al. | | |
| 10,359,000 B2 * | 7/2019 | Gniesmer | ................ | F16J 10/04 |
| 2018/0010549 A1 | 1/2018 | Gniesmer | | |
| 2018/0066601 A1 | 3/2018 | Sharma et al. | | |

FOREIGN PATENT DOCUMENTS

| | | |
|---|---|---|
| DE | 19901071 | 11/2000 |
| JP | S543633 | 1/1979 |
| JP | S58142341 | 9/1983 |

* cited by examiner

*Primary Examiner* — Long T Tran
*Assistant Examiner* — James J Kim
(74) *Attorney, Agent, or Firm* — Leydig, Voit & Mayer, Ltd.

(57) ABSTRACT

A cylinder liner for a cylinder bore of an internal combustion engine is provided. The cylinder liner including a hollow cylindrical body and a coolant cavity defined between a sidewall of the cylinder bore and an outer surface of the cylinder liner. A plurality of lower seal grooves are provided in the outer surface of the cylinder liner. A lower liner support is arranged between an uppermost one of the lower seal grooves and the coolant cavity. The lower liner support has an asymmetric configuration in a circumferential direction such that a clearance between the sidewall of the cylinder bore and the outer surface of the cylindrical body is relatively less in an area surrounding a thrust/anti-thrust plane and is relatively more in an area surrounding a perpendicular plane.

20 Claims, 6 Drawing Sheets

LINER FOR ENGINE CYLINDER WITH LOWER LINER SUPPORT

TECHNICAL FIELD

This disclosure relates generally to a cylinder liner for a cylinder of an internal combustion engine and, more particularly, to a cylinder liner for an engine cylinder that provides increased support of a lower portion of the cylinder liner.

BACKGROUND

An internal combustion engine, such as a diesel or gasoline engine, includes an engine block defining a plurality of engine bores. During operating of the engine, pistons reciprocate within the cylinder bores due to combustion of the fuel and generate mechanical power. Each cylinder bore may include a cylinder liner fitted within the cylinder bore and within which the piston reciprocates. Cylinder liners allow an engine with a particular cylinder bore configuration and size to be used with different diameter pistons by simply changing the cylinder liners for a particularly configured engine. Additionally, the cylinder liners may be removed and replaced if worn or damaged.

During operation, the cylinder liner can be subject to high loads and stresses which can be a particular problem with relatively thin wall cylinder liners. To help provide structural support for the liner, a tight clearance may be provided between the cylinder liner and the cylinder bore. However, the cylinder liner can also be subject to high thermal stresses during operation. More particularly, because the piston slides on the inner surface of the cylinder liner and the cylinder liner bounds at least a portion of the combustion chamber, heat may be produced that is transferred from interior side of the cylinder liner to an exterior side of the cylinder liner. To help dissipate heat, an outer surface of the cylinder liner can form a coolant circulation space for cooling the cylinder liner. Proper flow of the coolant is needed in order to prevent pitting of the liner.

U.S. Patent Application Pub. No. 2018/0010549 discloses a cylinder liner that has an oval shaped upper collar and a sidewall with a rotationally asymmetric outer contour except in the area of the seat of the liner in the crankcase and the sealing element zones. The publication indicates that this configuration helps prevent damage to the cylinder liner from cavitation of the coolant caused by the mechanical and thermal stresses on the cylinder liner during operation of the engine. However, the disclosed configuration does not address mechanical and thermal stresses that occur in the region of the sealing elements at the lower end of the cylinder liner that prevent coolant from escaping into the crankcase.

SUMMARY

In one aspect, the disclosure describes a cylinder liner for a cylinder bore of an internal combustion engine in which a piston reciprocates. The piston has an angularly attached connecting rod that defines a thrust/antithrust plane in which the piston exerts a side thrust on the cylinder liner and a perpendicular plane that extends perpendicularly relative to the thrust/anti-thrust plane. The cylinder liner includes a hollow cylindrical body having a lower end and an upper end. A coolant cavity is defined between a sidewall of the cylinder bore and an outer surface of the cylinder liner. A plurality of lower seal grooves are provided in the outer surface of the cylinder liner each of which includes a respective lower seal member. The lower seal grooves are arranged between the coolant cavity and the lower end of the cylindrical body. A lower liner support is arranged between an uppermost one of the lower seal grooves and the coolant cavity. The lower liner support has an asymmetric configuration in a circumferential direction such that a clearance between the sidewall of the cylinder bore and the outer surface of the cylindrical body is relatively less in a first area surrounding the thrust/anti-thrust plane and is relatively more in a second area surrounding the perpendicular plane.

In another aspect, the disclosure describes an engine. The engine includes an engine block including a cylinder bore. A cylinder liner is supported in the cylinder bore and includes a hollow cylindrical body having a lower end and an upper end. A piston is supported for reciprocating movement in the cylinder liner by an angularly attached connecting rod that defines a thrust/antithrust plane in which the piston exerts a side thrust on the cylinder liner and a perpendicular plane that extends perpendicularly relative to the thrust/anti-thrust plane. A coolant cavity is defined between a sidewall of the cylinder bore and an outer surface of the cylinder liner. A plurality of lower seal grooves are provided in the outer surface of the cylinder liner, each of which includes a respective lower seal member. The lower seal grooves are arranged between the coolant cavity and the lower end of the cylindrical body. A lower liner support is arranged between an uppermost one of the lower seal grooves and the coolant cavity. The lower liner support has an asymmetric configuration in a circumferential direction of the cylinder bore and cylinder liner such that a clearance between the sidewall of the cylinder bore and the outer surface of the cylindrical body is relatively less in a first area surrounding the thrust/anti-thrust plane and is relatively more in a second area surrounding the perpendicular plane.

In yet another aspect, the disclosure describes a cylinder liner for a cylinder bore of an internal combustion engine in which a piston reciprocates. The piston has an angularly attached connecting rod that defines a thrust/antithrust plane in which the piston exerts a side thrust on the cylinder liner and a perpendicular plane that extends perpendicularly relative to the thrust/anti-thrust plane. The cylinder liner includes a hollow cylindrical body having a lower end and an upper end. A coolant cavity is defined between a sidewall of the cylinder bore and an outer surface of the cylinder liner. A plurality of lower seal grooves are provided in the outer surface of the cylinder liner each of which includes a respective lower seal member. The lower seal grooves are arranged between the coolant cavity and the lower end of the cylindrical body. A lower liner support is arranged between an uppermost one of the lower seal grooves and the coolant cavity on at least one of the sidewall of the cylinder bore and the outer surface of the cylinder liner. The lower liner support has an asymmetric configuration in a circumferential direction of the cylinder bore and cylinder liner such that a clearance between the sidewall of the cylinder bore and the outer surface of the cylindrical body is relatively less in a first area surrounding the thrust/anti-thrust plane and is relatively more in a second area surrounding the perpendicular plane.

DETAILED DESCRIPTION

Figure 1:
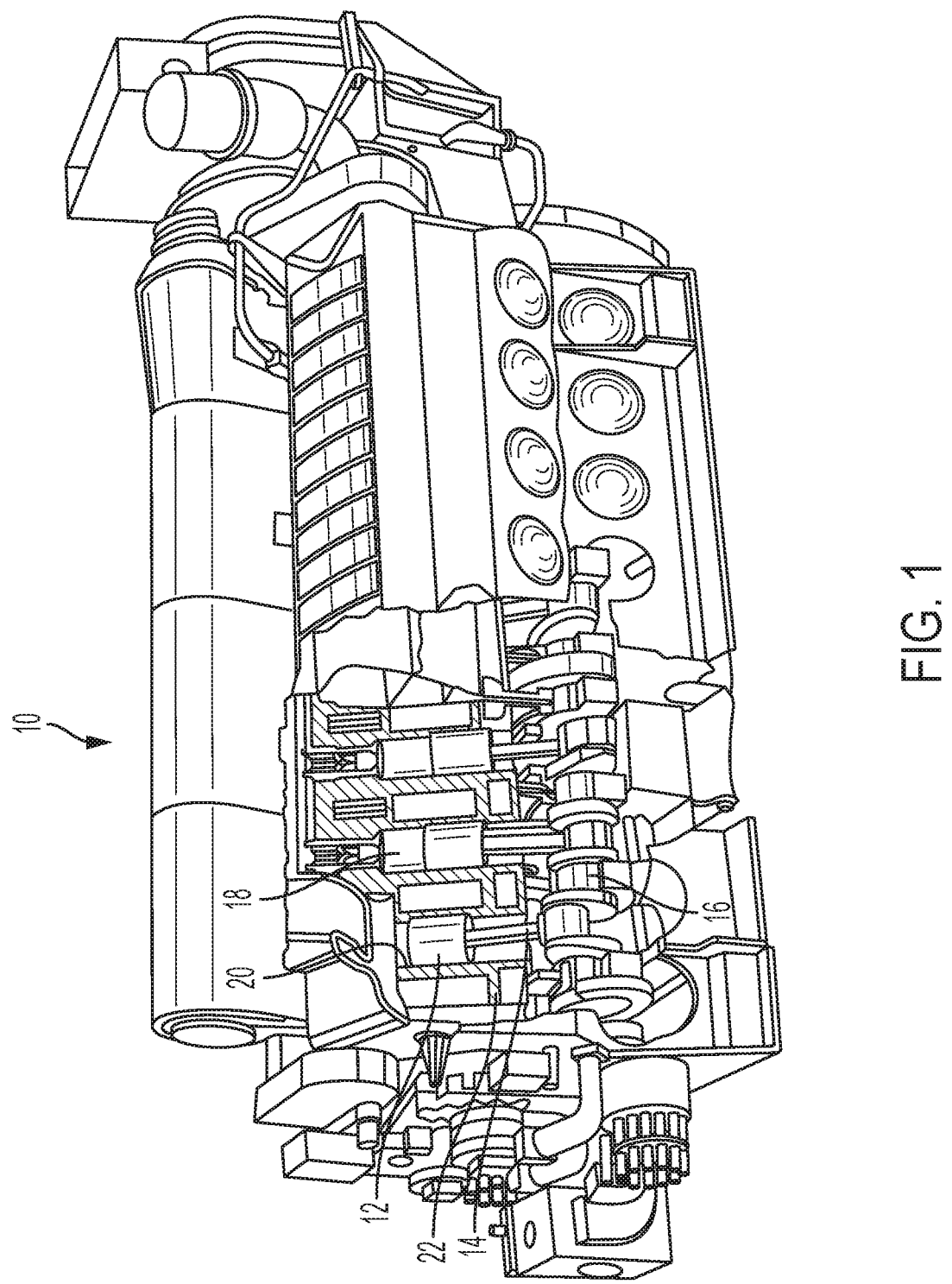
FIG. 1 is a partially cut-away perspective view of an exemplary engine according to the present disclosure.

This disclosure relates to a cylinder liner for a cylinder bore of an engine. Now referring to the drawings, wherein like reference numbers refer to like elements, FIG. 1 illustrates an exemplary embodiment of an engine 10 that may be, for example, a diesel engine, a gasoline engine, or a gaseous fuel-powered engine. In the disclosed embodiment, the engine 10 is a four-stroke diesel engine. One skilled in the art will recognize, however, that the engine 10 may be any other type of combustion engine such as, for example, a two or four-stroke gasoline or gaseous fuel-powered engine.

The engine 10 may include, among other things, an assembly of pistons 12, connecting rods 14, and a crankshaft 16. Each piston 12 may be connected to the crankshaft 16 by a corresponding one of the connecting rods 14, such that movement of the piston 12 results in rotation of the crankshaft 16. These components may operate together to transform chemical energy in fuel into rotational motion of the crankshaft 16 through a series of explosions within combustion chambers 18 of the engine 10. These explosions may cause the pistons 12 and connecting rods 14 of the engine 10 to reciprocate within the cylinder bores 20. In this manner, the cylinder bores 20 may serve as pressure vessels in which the process of combustion takes place and as guides for the pistons 12 sliding within them. The cylinder bores 20 may be arranged within an engine block 22 in two banks positioned at an angle to each other. Each bank may include a group of cylinders 20 located on the same side of the crankshaft 16 with their axes lying in a common plane passing through an axis of the crankshaft 16. Each cylinder bore 20 may have a sidewall 24 and may be sealed at its top by a cylinder head.

Figure 2:
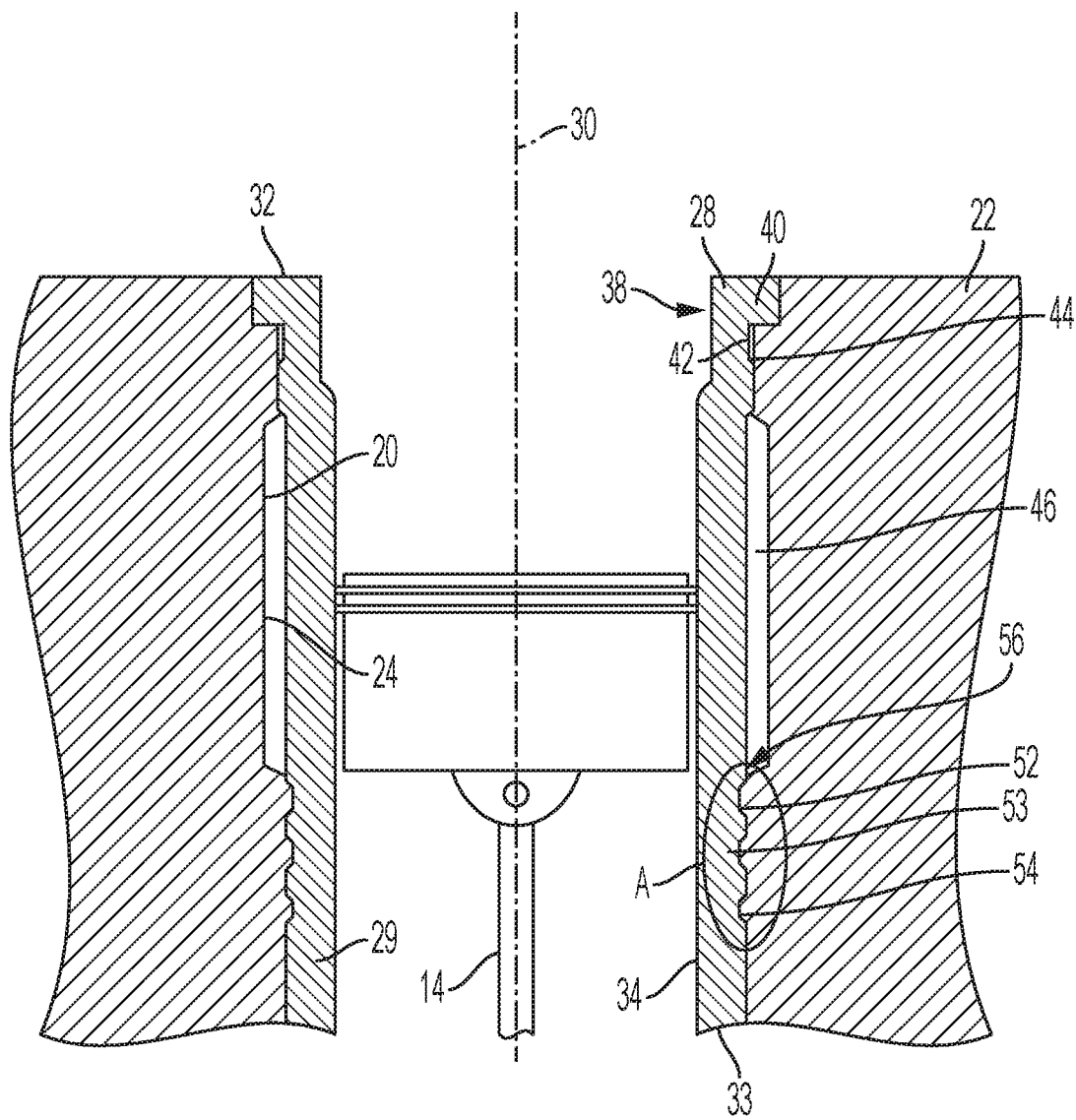
FIG. 2 is a cross-sectional view of an exemplary cylinder bore and cylinder liner according to the present disclosure.

FIG. 2 illustrates a cross-sectional view of an exemplary cylinder liner 28 that may be used to protect an associated cylinder bore 20 from wear and degradation caused by the piston 12. The cylinder liner 28 may be removably mounted within the cylinder bore 20, in which the piston 12 reciprocates. The cylinder liner 28 may have a hollow generally cylindrical body 29 extending along a longitudinal axis 30 with an upper end 32 and a lower end 33. During operation of the engine 10, an inner surface 34 of the cylinder liner 28 may form a sliding surface for the corresponding piston 12 as the piston 12 is driven in an up-and-down reciprocating motion by the connecting rod 14 and crankshaft 16 (shown in FIG. 1). The cylinder liner 28 may be any type of steel or cast iron.

As shown in FIG. 2, the upper end 32 of the cylinder liner 28 may also include an annular shoulder portion 38 that may include an annular flange 40 extending radially outward from the upper end of the cylinder liner 28. An outer surface of the flange 40 may mate with an annular step-like mounting surface formed in the engine block 22 to secure the cylinder liner 28 in place and to prevent the cylinder liner 28 from sliding down further into the cylinder bore 20. The shoulder portion 38 may also include an annular recess 42 adjacent to flange 40 that may be configured to receive an upper seal member 44 that is provided between the cylinder liner 28 and the engine block 22. The upper seal member 44 may be configured to seal off water and/or oil from leaking externally from the engine. In some embodiments, the seal member 44 may embody an O-ring, however, any other seal known in the art may be used, as desired. Not all cylinder liners include an annular shoulder portion at the upper end and not all engine blocks include a mating step-like mounting surface and the present disclosure is not limited to liners and blocks having such an arrangement.

During operation of the engine 10, combustion in the combustion chamber 18 may cause the cylinder liner 28 to become heated. To help dissipate this heat, the engine block 22 and cylinder liner 28 may be configured so as to allow coolant (e.g., water, glycol, or a blended mixture) to circulate along an outer surface 48 of the cylinder liner 28. For example, the cylinder bore 20 may be configured to include a coolant jacket or cavity 46 comprising an area where there is an increased clearance between the outer surface 48 of the cylinder liner 28 and the sidewall 24 of the cylinder bore 20. In the illustrated embodiment, the coolant cavity 46 is located around a center portion of the cylinder bore 20 and cylinder liner 28.

To help prevent coolant from leaking into the crankcase, the cylinder liner 28 may be provided with a plurality of lower seal members 49, 50, 51 (shown in FIG. 3) that are arranged below the coolant cavity 46. Each of the lower seal members 49, 50, 51 may be arranged in a corresponding one of a plurality of lower seal grooves 52, 53, 54 (also shown in FIG. 3) in the outer surface 48 of the cylinder liner 28 that are provided near the lower end 33 of the cylinder liner 28. The lower seal members 49, 50, 51 may be arranged in their respective grooves 52, 53, 54 such that the seal member extends between the outer surface 48 of the cylinder liner 28 and the sidewall 24 of the cylinder bore 20. In the illustrated embodiment, three lower seal grooves 52, 53, 54 and three seal members 49, 50, 51 are provided in a longitudinally spaced arrangement. However, in other embodiments, a different number of lower seal members and lower seal grooves may be provided. In some embodiments, the lower seal members 49, 50, 51 may embody O-rings, but other types of seal members may also be used. The seal members 49, 50, 51 may be made of EPDM (ethylene propylene diene monomer), or fluoroelastomers such as coolant-resistant FKM, or any other suitable material.

As a result of the angle of the connecting rod 14 with respect to the piston 12, the piston 12 is thrust against the sides of the cylinder bore 20 during operation of the engine 10. In particular, as the piston 12 is pushed down the cylinder bore 20 on its power stroke, the piston 12 will meet resistance as it tries to turn the crank shaft. This resistance will cause the piston 12 to exert a side thrust on the cylinder liner 28. The side on which this thrust is applied is sometimes referred to as the thrust side. Likewise, as the piston 12 moves up on its compression stroke and meets the resistance of the air/fuel mixture in the combustion chamber 18 a side thrust is exerted by the piston on the opposing side of the cylinder liner 28 (i.e., the side opposite where the thrust is applied on the power stroke). The side on which this thrust is applied is sometimes referred to as the anti-thrust side. The plane connecting the thrust and anti-thrust sides of the cylinder is sometimes referred to as the thrust/anti-trust plane and is generally a plane that extends perpendicular to the rotational axis defined by the pin connecting the connecting rod 14 to the piston 12.

An area where these stresses may be a particular problem with respect to the cylinder liner 28 is the area between the lower seal grooves 52, 53, 54 and the coolant cavity 46. More specifically, the area of potential concern may be the area between the uppermost lower seal groove 52 and the lower edge of the coolant cavity 46. To help minimize stress caused by the piston side thrusts in this area, the cylinder liner 28 and/or cylinder bore 20 may be configured with a variable dimension lower liner support 56 that may be located in the area immediately above the groove in the cylinder liner for the lower seal member in this case the uppermost lower seal member 49 and groove 52 and below the coolant cavity 46. As described in greater detail below, this lower liner support 56 may be configured to limit displacement of the cylinder liner 28 caused by the piston side thrust while still permitting coolant flow around the cylinder liner 28.

To this end, the lower liner support 56 may be configured such that the clearance between the outer surface 48 of the cylinder liner 28 and the sidewall 24 of the cylinder bore 20 varies in the circumferential direction. More specifically, the lower liner support 56 may be configured such that the clearance between the outer surface 48 of the cylinder liner 28 is reduced or minimized to provide a tight clearance in the area surrounding thrust/anti-thrust plane to provide support for the cylinder liner 28 while clearance is increased away from the thrust/anti-thrust plane to provide improved coolant flow. In one embodiment, the clearance may be maximized in area surrounding the plane perpendicular to the thrust/anti-thrust plane, i.e. rotated 90°. The variable clearance that defines the lower liner support 56 can be implemented via configuration of either the cylinder bore 20 or the outer surface 48 of the cylinder liner 28.

Figure 3:
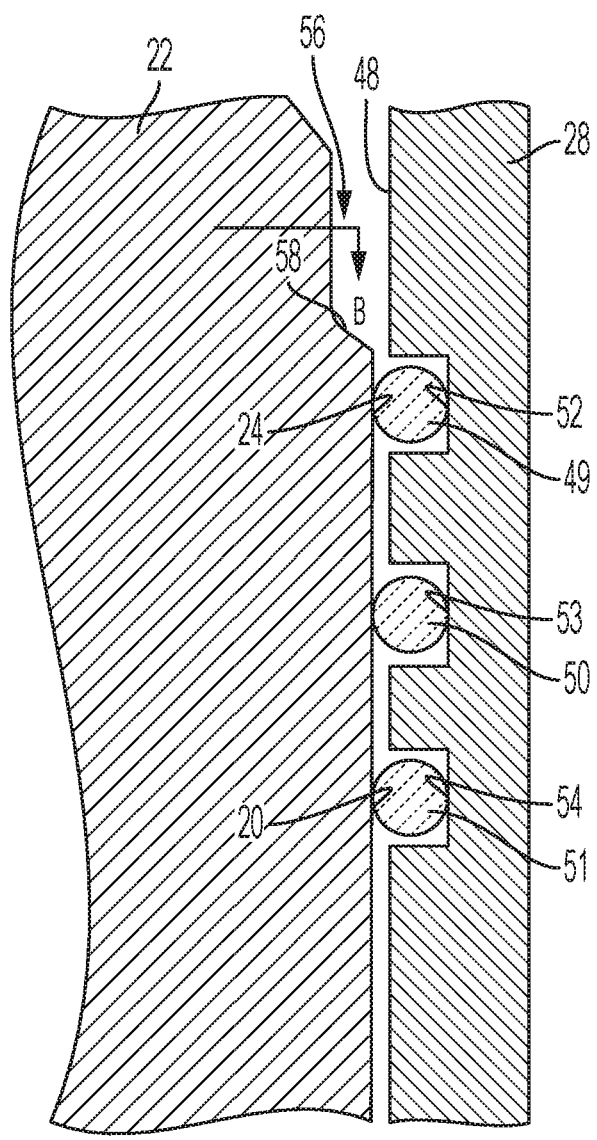
FIG. 3 is an enlarged cross-sectional view of detail A of the cylinder bore and cylinder liner of FIG. 2 showing a lower liner support.
Figure 4A:
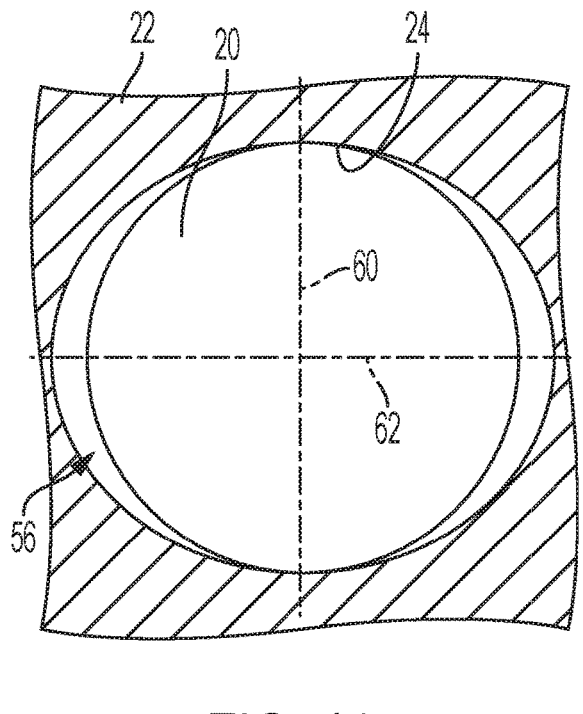
FIGS. 4A-D are cross-sectional views of the cylinder bore of FIG. 3 looking in the direction B-B showing different embodiments of the lower liner support of FIG. 3.
Figure 4B:
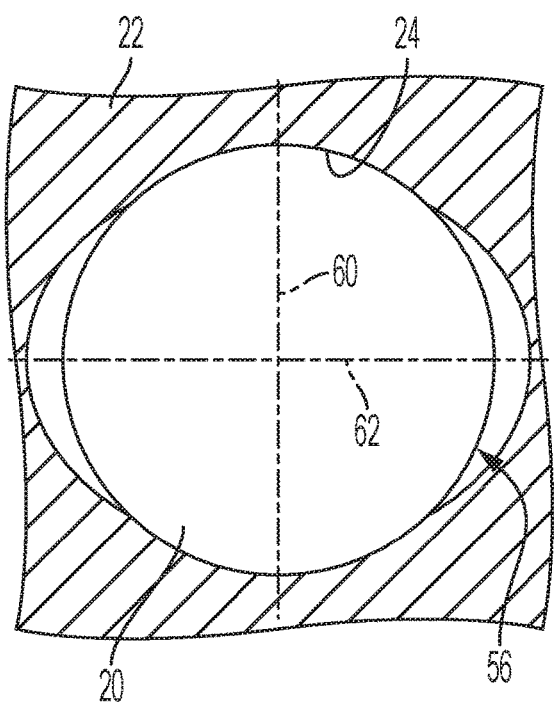
Figure 4C:
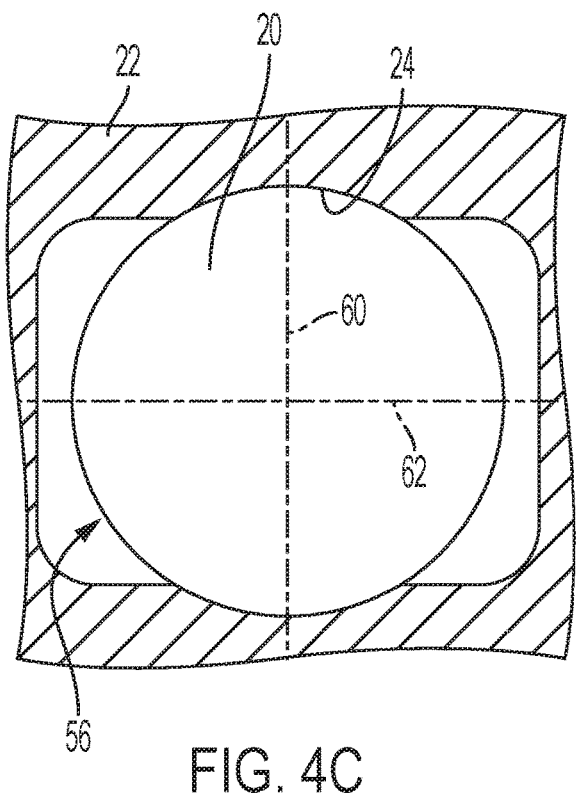
Figure 4D:
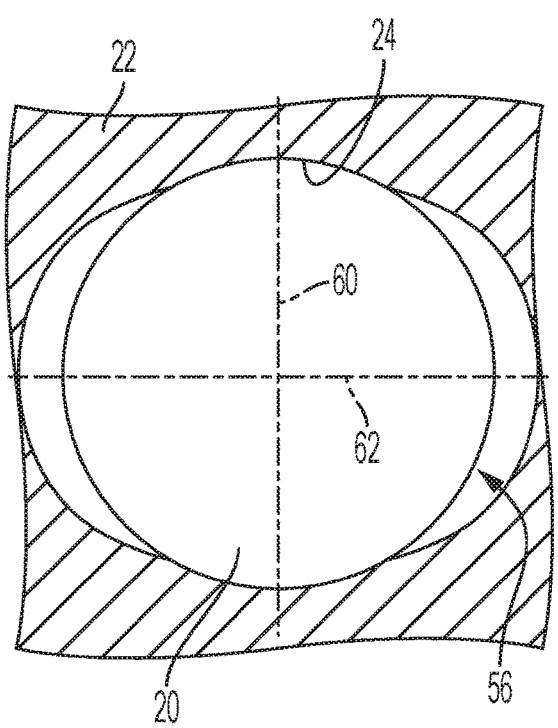

FIG. 3 illustrates an embodiment in which the lower liner support 56 is provided in the sidewall 24 of the cylinder bore 20. The area of the detail of FIG. 3 is identified by the letter A in FIG. 2. The cross-section of FIG. 3 shows the area of relatively larger clearance between the cylinder bore 20 and cylinder liner 28 that exists away from the thrust/anti-thrust plane and is maximized in the plane perpendicular to the thrust/anti-thrust plane. In the embodiment shown in FIG. 3, the lower liner support 56 includes a chamfer 58 in a lower corner; however, this chamfer is not necessary and need not be provided. The lower liner support 56 may be a feature that is machined into the engine block 22, such as may be the case with an existing engine block, or it may be formed when the block is cast. Alternatively, the lower liner support 56 may be implemented as a sleeved insert that is arranged in the cylinder bore 20 and thereby forms part of the cylinder bore 20.

The circumferentially variable configuration of the cylinder bore 20 that provides the lower liner support 56 is shown in FIGS. 4A-D. In FIGS. 4A-D, the thrust/anti-thrust plane is identified as 60 and the plane perpendicular to the thrust/anti-thrust plane is identified as 62. In each embodiment shown in FIGS. 4A-D, the cylinder bore 20 is configured with an enlarged diameter in the area surrounding the perpendicular plane 62 as compared to the diameter in the area surrounding the thrust/anti-thrust plane 60. In the area of the perpendicular plane 62, the increased diameter leads to increased clearance between the sidewall 24 of the cylinder bore 20 and the cylinder liner 28 to allow coolant flow while the thrust/anti-thrust plane 60 surrounding area has a tight clearance that can provide increased support for the cylinder liner 28 against piston side thrusts.

In each of the FIGS. 4A-D embodiments, the increased diameter of the cylinder bore 20 in the area around the perpendicular plane 62 is achieved using a different geometry. The embodiments of FIGS. 4A and 4B configure the lower liner support 56 using an elliptical shape in the sidewall 24 of the cylinder bore 20 with the minor axis of the ellipse in the thrust/anti-thrust plane 60 and the major axis of the ellipse in the perpendicular plane 62. The elliptical shape of the FIG. 4B embodiment provides a larger area of tight clearance surrounding the thrust/anti-thrust plane 60 than the embodiment of FIG. 4A. The geometry of the FIG. 4C embodiment implements the lower liner support 56 using a rectangular step in the area surrounding the perpendicular plane 62 while a radiused curve is still provided in the area surrounding the thrust/anti-thrust plane 60. The embodiment of the lower liner support 56 shown in FIG. 4D utilizes variable radiused curves in the area surrounding the perpendicular plane 62 to provide increase clearance for coolant flow with the maximum radius being provide at the point of the perpendicular plane 62. While various exemplary configurations are shown in FIGS. 4A-D, the lower liner support 56 also may be implemented in the cylinder bore 20 using other geometries consistent with this disclosure.

Figure 5:
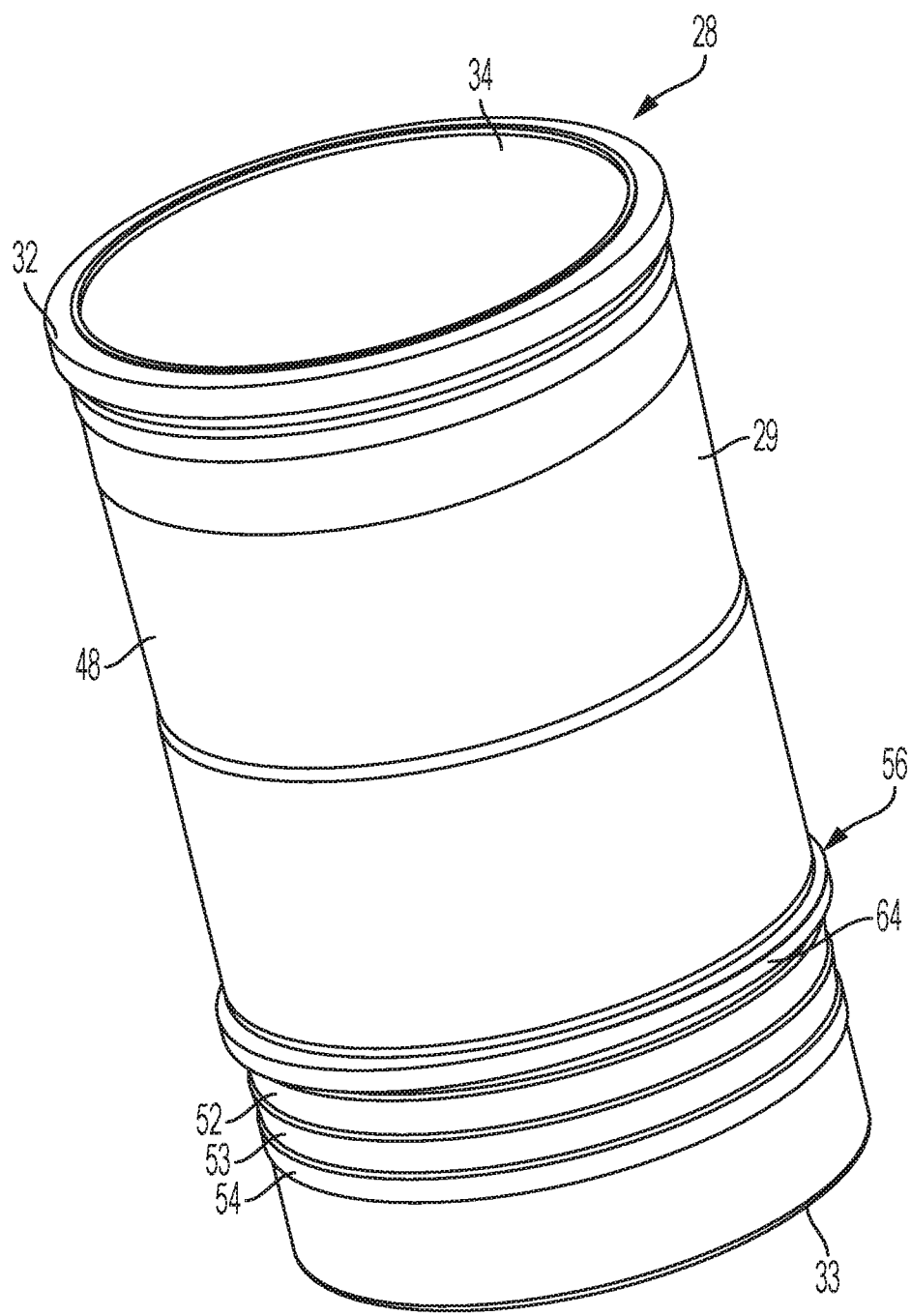
FIG. 5 is perspective view of a cylinder liner having a further embodiment of a lower liner support.
Figure 6A:
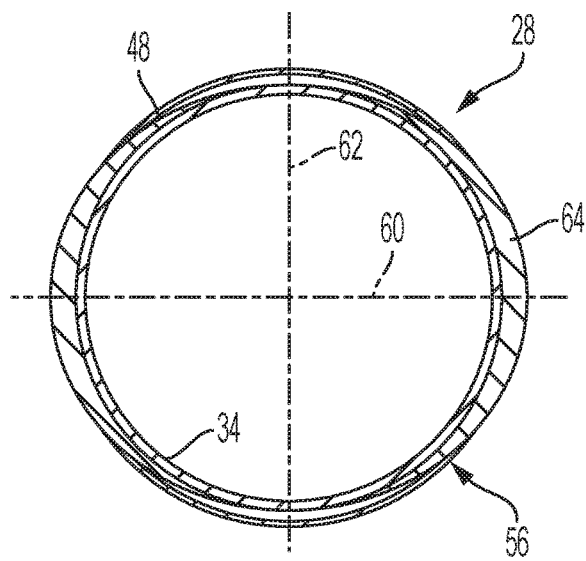
FIG. 6A-C are cross-sectional views of the cylinder liner of FIG. 5 showing different embodiments of the lower liner support of FIG. 5
Figure 6B:
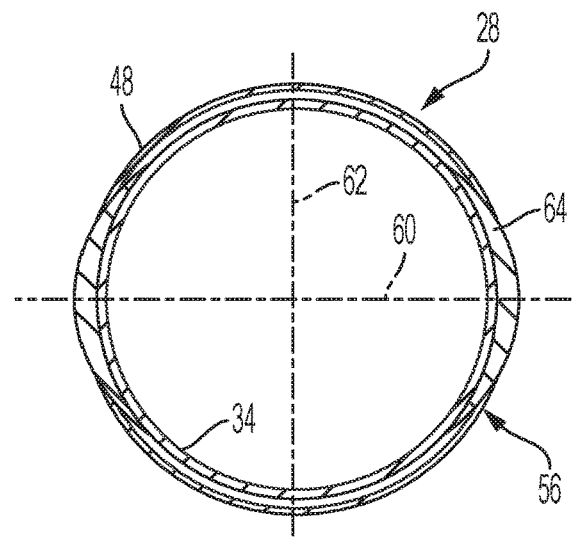
Figure 6C:
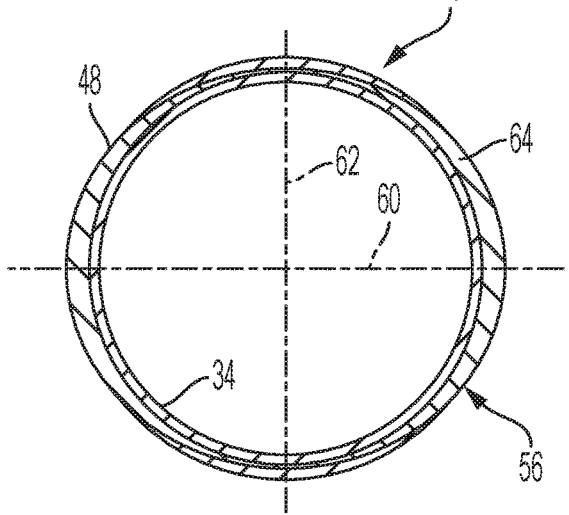

FIG. 5 illustrates an alternative embodiment in which the lower liner support 56 is implemented on the outer surface 48 of the cylinder liner 28. In the FIG. 5 embodiment, the lower liner support 56 comprises an annular flange 64 on the outer surface 48 of the cylinder liner 28 that is again arranged above the uppermost lower seal member groove 52. This flange 64 has an asymmetrical configuration in the circumferential direction. As when providing the lower liner support 56 in the cylinder bore 20, the flange 64 defining the lower liner support 56 on the cylinder liner 28 can have different geometries as shown in FIGS. 6A-C. In each of these geometries, the cylinder liner 28 can be inserted in the cylinder bore 20 and aligned such that the flange 64 minimizes clearance between the outer surface 48 of the cylinder liner 28 in the area surrounding the thrust/anti-thrust plane 60 to provide support against piston side thrusts while maximizing clearance in the area surrounding the perpendicular plane 62 to provide increased coolant flow.

In the embodiments of FIGS. 6A and 6B, the flange 64 defining the lower liner support 56 has an elliptical configuration with the major axis of the ellipse in the thrust/anti-thrust plane 60 to minimize the clearance to the cylinder bore 20 for increased support and the minor axis is in the perpendicular plane 62 to provide for increased coolant flow. The embodiment of FIG. 6A is configured so as to provide a larger area of tight clearance surrounding the thrust/anti-thrust plane 60 than the embodiment of FIG. 6B while the embodiment of FIG. 6B provides a larger area of greater clearance surrounding the perpendicular plane 62. The embodiment of FIG. 6C utilizes variable radiused curves in the area surrounding the thrust/anti-thrust plane 60 to provide increased support for the cylinder liner 28 with the maximum radius being provided at the point of the thrust/anti-thrust plane 60. While various exemplary configurations are shown in FIGS. 6A-C, the lower liner support 56 also may be implemented on the cylinder liner 28 using a flange 64 with other geometries consistent with this disclosure.

INDUSTRIAL APPLICABILITY

The disclosed cylinder liner 28 and cylinder bore 20 arrangement may be used in any application where it is desired to increase the reliability and operating life of the associated engine. The disclosure may be particularly relevant to cylinder liners having relatively thin walls which may have an increased risk of damage due to piston thrusts. The tighter clearance provided by the disclosed lower liner support 56 in the area surrounding the thrust/anti-thrust plane may help to minimize stress in the cylinder liner by controlling the displacement of the liner in the area immediately above the lower seal members under loading caused by movement of the piston. Meanwhile, the increased clearance in area surrounding the plane perpendicular to the thrust/anti-thrust plane may help prevent liner pitting due to cavitation or corrosion due to low coolant flow.

This disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A cylinder liner for a cylinder bore of an internal combustion engine in which a piston reciprocates, the piston having an angularly attached connecting rod that defines a thrust/antithrust plane in which the piston exerts a side thrust on the cylinder liner and a perpendicular plane that extends perpendicularly relative to the thrust/anti-thrust plane, the cylinder liner comprising:
   a hollow cylindrical body having a lower end and an upper end;
   a coolant cavity defined between a sidewall of the cylinder bore and an outer surface of the cylinder liner;
   a plurality of lower seal grooves in the outer surface of the cylinder liner each of which includes a respective lower seal member, the lower seal grooves being arranged between the coolant cavity and the lower end of the cylindrical body; and
   a lower liner support arranged between an uppermost one of the lower seal grooves and the coolant cavity, the lower liner support having an asymmetric configuration in a circumferential direction of the cylinder liner and cylinder bore such that a clearance between the sidewall of the cylinder bore and the outer surface of the cylindrical body is relatively less in a first area surrounding the thrust/anti-thrust plane and is relatively more in a second area surrounding the perpendicular plane.

2. The cylinder liner of claim 1 wherein the lower liner support is provided in the sidewall of the cylinder bore.

3. The cylinder liner of claim 2 wherein the lower liner support has an elliptical configuration when viewed in a direction defined by a longitudinal axis of the cylinder bore with a minor diameter in the thrust/anti-thrust plane and a major diameter in the perpendicular plane.

4. The cylinder liner of claim 2 wherein the lower liner support has a varying diameter in a direction perpendicular to a longitudinal axis of the cylinder bore with the diameter reaching a maximum in the perpendicular plane and a minimum in the thrust/anti-thrust plane.

5. The cylinder liner of claim 2 wherein the lower liner support has a rectangular step in an area surrounding the perpendicular plane.

6. The cylinder liner of claim 2 wherein the lower liner support has multiple variable radiused curves in a direction perpendicular to a longitudinal axis of the cylinder bore with a maximum radius in the perpendicular plane and a minimum radius in the thrust/anti-thrust plane.

7. The cylinder liner of claim 1 wherein the lower liner support comprises an annular flange on the outer surface of the cylinder liner.

8. The cylinder liner of claim 7 wherein the flange defining the lower liner support has an elliptical configuration when viewed in a direction defined by a longitudinal axis of the cylinder liner with a major diameter in the thrust/anti-thrust plane and a minor diameter in the perpendicular plane.

9. The cylinder liner of claim 7 wherein the flange defining the lower liner support has a varying diameter in a direction perpendicular to a longitudinal axis of the cylinder liner with the diameter reaching a minimum in the perpendicular plane and a maximum in the thrust/anti-thrust plane.

10. The cylinder liner of claim 7 wherein the flange defining the lower liner support has multiple variable radiused curves in a direction perpendicular to a longitudinal axis of the cylinder liner with a minimum radius in the perpendicular plane and a maximum radius in the thrust/anti-thrust plane.

11. An engine comprising:
    an engine block including a cylinder bore;
    a cylinder liner supported in the cylinder bore and including a hollow cylindrical body having a lower end and an upper end;
    a piston supported for reciprocating movement in the cylinder liner by an angularly attached connecting rod that defines a thrust/antithrust plane in which the piston exerts a side thrust on the cylinder liner and a perpendicular plane that extends perpendicularly relative to the thrust/anti-thrust plane;
    a coolant cavity defined between a sidewall of the cylinder bore and an outer surface of the cylinder liner;
    a plurality of lower seal grooves in the outer surface of the cylinder liner each of which includes a respective lower seal member, the lower seal grooves being arranged between the coolant cavity and the lower end of the cylindrical body; and
    a lower liner support arranged between an uppermost one of the lower seal grooves and the coolant cavity, the lower liner support having an asymmetric configuration in a circumferential direction of the cylinder bore and cylinder liner such that a clearance between the sidewall of the cylinder bore and the outer surface of the cylindrical body is relatively less in a first area surrounding the thrust/anti-thrust plane and is relatively more in a second area surrounding the perpendicular plane.

12. The engine of claim 11 wherein the lower liner support is provided in the sidewall of the cylinder bore.

13. The engine of claim 12 wherein the lower liner support has an elliptical configuration when viewed in a direction defined by a longitudinal axis of the cylinder bore with a minor diameter in the thrust/anti-thrust plane and a major diameter in the perpendicular plane.

14. The engine of claim 12 wherein the lower liner support has a varying diameter in a direction perpendicular to a longitudinal axis of the cylinder bore with the diameter reaching a maximum in the perpendicular plane and a minimum in the thrust/anti-thrust plane.

15. The engine of claim 2 wherein the lower liner support has a rectangular step in an area surrounding the perpendicular plane.

16. The engine of claim 11 wherein the lower liner support comprises an annular flange on the outer surface of the cylinder liner.

17. The engine of claim 16 wherein the flange defining the lower liner support has an elliptical configuration when viewed in a direction defined by a longitudinal axis of the cylinder liner with a major diameter in the thrust/anti-thrust plane and a minor diameter in the perpendicular plane.

18. The engine of claim 16 wherein the flange defining the lower liner support has a varying diameter in a direction perpendicular to a longitudinal axis of the cylinder liner with the diameter reaching a minimum in the perpendicular plane and a maximum in the thrust/anti-thrust plane.

19. The engine of claim 16 wherein the flange defining the lower liner support has multiple variable radiused curves in a direction perpendicular to a longitudinal axis of the cylinder liner with a minimum radius in the perpendicular plane and a maximum radius in the thrust/anti-thrust plane.

20. A cylinder liner for a cylinder bore of an internal combustion engine in which a piston reciprocates, the piston having an angularly attached connecting rod that defines a thrust/antithrust plane in which the piston exerts a side thrust on the cylinder liner and a perpendicular plane that extends perpendicularly relative to the thrust/anti-thrust plane, the cylinder liner comprising:

a hollow cylindrical body having a lower end and an upper end;

a coolant cavity defined between a sidewall of the cylinder bore and an outer surface of the cylinder liner;

a plurality of lower seal grooves in the outer surface of the cylinder liner each of which includes a respective lower seal member, the lower seal grooves being arranged between the coolant cavity and the lower end of the cylindrical body; and a lower liner support arranged between an uppermost one of the lower seal grooves and the coolant cavity on at least one of the sidewall of the cylinder bore and the outer surface of the cylinder liner, the lower liner support having an asymmetric configuration in a circumferential direction of the cylinder bore and cylinder liner such that a clearance between the sidewall of the cylinder bore and the outer surface of the cylindrical body is relatively less in a first area surrounding the thrust/anti-thrust plane and is relatively more in a second area surrounding the perpendicular plane.

* * * * *